July 20, 1965  F. JONKER  3,195,399
METHOD AND APPARATUS FOR DISSEMINATION OF INFORMATION
RETRIEVAL SYSTEMS AND ENLARGEMENT OF CAPACITY
Filed Sept. 10, 1959  6 Sheets-Sheet 1
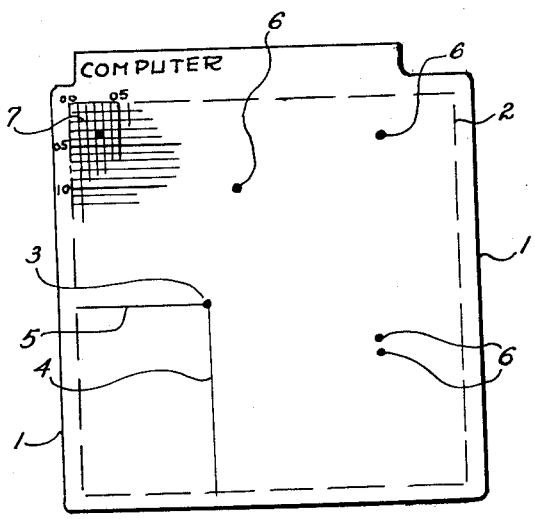
FIG. 1
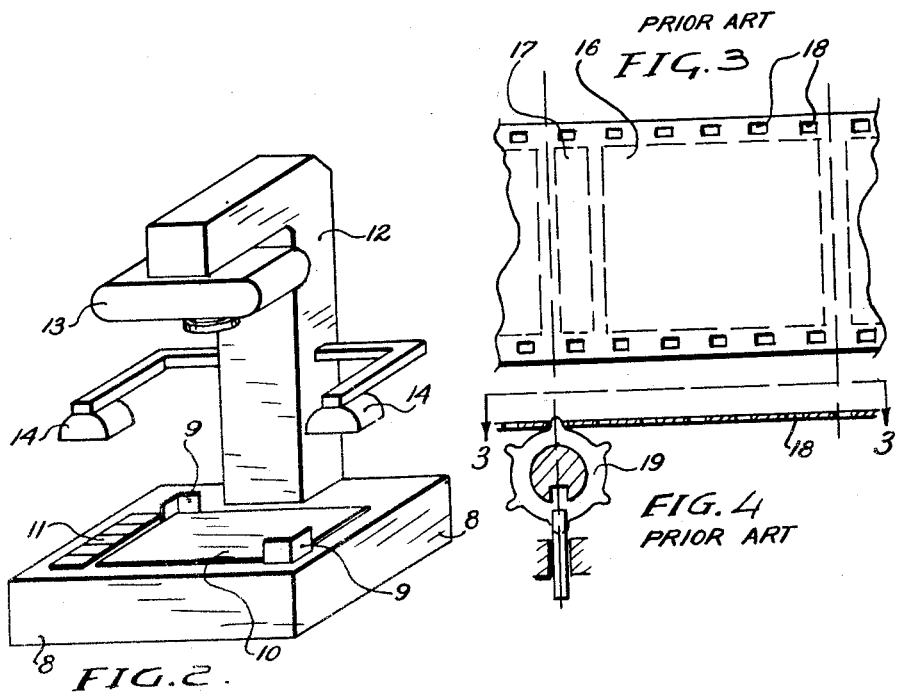
FIG. 2
FIG. 3 PRIOR ART
FIG. 4 PRIOR ART
INVENTOR
FREDERICK JONKER July 20, 1965     F. JONKER     3,195,399
METHOD AND APPARATUS FOR DISSEMINATION OF INFORMATION
RETRIEVAL SYSTEMS AND ENLARGEMENT OF CAPACITY
Filed Sept. 10, 1959     6 Sheets-Sheet 2
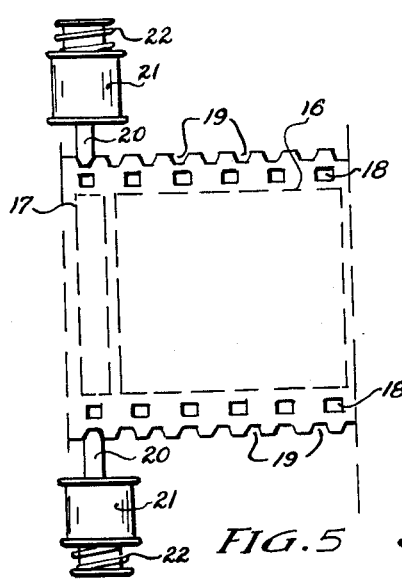
FIG. 5
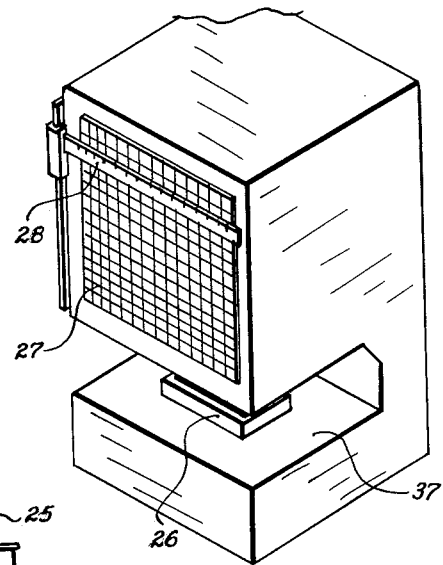
FIG. 7
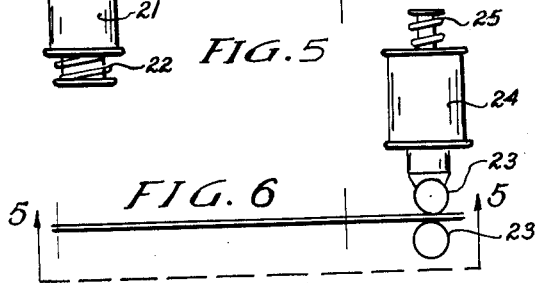
FIG. 6
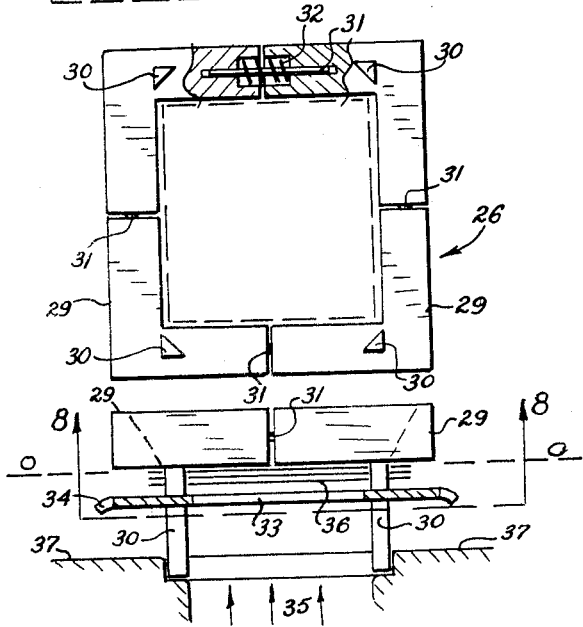
FIG. 8
FIG. 9
INVENTOR
FREDERICK JONKER July 20, 1965 F. JONKER 3,195,399
METHOD AND APPARATUS FOR DISSEMINATION OF INFORMATION
RETRIEVAL SYSTEMS AND ENLARGEMENT OF CAPACITY
Filed Sept. 10, 1959 6 Sheets-Sheet 3

INVENTOR
FREDERICK JONKER

INVENTOR
FREDERICK JONKER

July 20, 1965  F. JONKER  3,195,399
METHOD AND APPARATUS FOR DISSEMINATION OF INFORMATION
RETRIEVAL SYSTEMS AND ENLARGEMENT OF CAPACITY
Filed Sept. 10, 1959  6 Sheets-Sheet 5

INVENTOR
FREDERICK JONKER

July 20, 1965 F. JONKER 3,195,399
METHOD AND APPARATUS FOR DISSEMINATION OF INFORMATION
RETRIEVAL SYSTEMS AND ENLARGEMENT OF CAPACITY
Filed Sept. 10, 1959 6 Sheets-Sheet 6

INVENTOR
FREDERICK JONKER

United States Patent Office 3,195,399
Patented July 20, 1965

3,195,399
METHOD AND APPARATUS FOR DISSEMINATION OF INFORMATION RETRIEVAL SYSTEMS AND ENLARGEMENT OF CAPACITY
Frederick Jonker, Washington, D.C., assignor to Jonker Business Machines, Inc., a corporation of Delaware
Filed Sept. 10, 1959, Ser. No. 839,242
18 Claims. (Cl. 88—24)

The present invention pertains to information retrieval systems of the general nature of superimposable card systems, or peekaboo systems, commercially also known as Termatrex systems.

It is contemplated that the present invention may serve for instance as an index to, for example, a file of documents, such as reports, books, or cards. In such case, each of the documents is, according to the teachings of the present invention, assigned an accession number, and the documents are stored in sequence according to this number. When information on a given subject is desired, certain terms describing this subject may be entered into a machine which will then produce the accession numbers of all of those documents in the files which contain information on the desired subject.

In my United States patent application Serial No. 583,774, filed May 9, 1956, and entitled "Selection Method and Apparatus for Indexing Documents and the Like with Extreme Rapidity," Patent No. 3,092,114, and in my United States patent application Serial No. 579,110, filed April 18, 1956 and titled: "Simple Method and Apparatus to Perofrm Index Type Functions," Patent No. 3,052,150, are described machines of the same general nature as that which is contemplated by the present invention, the same using relatively large, thin, non-transparent flexible cards of metal, plastic, paper or other suitable material. In the machines described in the co-pending patent applications, a document having a certain accession number is entered on such a card by drilling a hole in a certain position which is dedicated to this accession number. Generally, the location of the position dedicated to a certain document can be identified by means of an x–y coordinate system. For example, the position dedicated to document 1225 can be found on each card by first moving 12 positions along the x-axis, followed by a move of 25 positions in the direction of the y-axis. Each of the cards in the system has the same position dedicated to the same accession number.

In the event the documents are classified according to a classification system, each of the cards of the indexing machine may be assigned to one of the classes, subclasses or sub-subclasses of the classification system. If, instead of a classification having a certain hierarchy, the subjects of the documents are described by a number of descriptive terms without any form of hierarchical subordination, each of these descriptive terms is assigned a certain card. For example, if it is desired to obtain from a file of reports on aircraft instrumentation indexed with descriptive terms, all reports which are concerned with the "testing of supersonic airspeed indicators," the investigator would, in practicing this invention, select the cards assigned to the term Testing or Test; the card assigned to the term Supersonic; and the card assigned to the term Airspeed Indicator; or, if this latter term is broken up into two separated terms, the investiigator would select the card assigned to the term Airspeed and the card asigned to the term Indicator. Classes, subclasses, phrases and one-word terms will be generally referred to hereinafter as "terms."

According to my co-pending application No. 579,110, now U.S. Patent No. 3,052,150 all of the cards so selected are superimposed and placed in the machine and a hole is drilled in all of these cards simultaneously at the position corresponding to the serial number of the document that is to be entered.

Conversely, if a search is to be made, all cards corresponding to the search terms are placed in superimposition in the machine. A lightsource in the base of the machine then shows the coinciding holes in these cards. A coordinate system then allows the positions of these members to be read off.

It is among the objects of the invention disclosed and claimed in said patent application Serial No. 583,774, now U.S. Patent No. 3,092,114 to provide a completely automatic apparatus for performing automatically functions of the class described hereinbefore, all in one machine.

Therefore, the teachings of the invention of the said co-pending application S.N. 583,774, filed May 9, 1956 comprehend a machine wherein the cards, in lieu of being assigned to terms, are assigned to symbols, or characters, such as letters, figures, and other symbols, the manner of which will be described hereinafter.

If the terms, phrases or classes to be recorded have a maximum length of, for example, ten (10) letters, there will be utilized ten (10) "basic character lists." Each of these basic character lists contains, for example, the twenty-six (26) letters of the alphabet, the numerals 0 through 9, and a few notations and marks, such as the +, the —, and the /, a total of, for instance, forty (40) basic characters in all. More basic characters might be added in the form of Roman numerals, the Greek alphabet, an alphabet of capitals, more notations, etc. Each of the basic characters is assigned a certain card in such a way that the letter "a" out of the first character list has a different card from the letter "a" out of the second character list, etc. Thus a total of 10×40=400 cards is provided. To enter a document, for example, document No. 5219 dealing with the testing of supersonic airspeed indicators, the words testing, supersonic, airspeed and indicators will have to be entered on the cards. In order to do this, the cards out of the first character list assigned to the firt letters of the descriptive terms, the *t*, the *s*, the *a* and the *i*, will have to be selected. Out of the second basic character list, the cards assigned to the letters *e*, *u*, *i* and *n* will have to be selected. Out of the third character list, it will be the cards assigned to the letters *s*, *p*, *r*, and *d*, etc. When all cards assigned to all the letters required to spell out these terms have thus been selected, they are superimposed and a hole is made which extends through all of the cards in the position dedicated to the document No. 5219.

This system greatly reduces the total number of cards required. For eaxmple, a file of 1,000,000 documents might require up to 50,000 classes and subclasses and therefore as many cards. If descriptive terms are used instead of a classification, up to 10,000 terms might be required and therefore as many cards. However, when using cards asigned to symbols, a file of 1,000,000 documents would require for example only 400 to 1,000 cards, depending, of course, on the length of the terms and the amount of symbols used.

Information retrieval systems based on said principles have definite limitations in size of the information collection that can be handled by such systems. The reasons are that there is a definite practical lower limit to the size of the holes one can use, and a definite practical upper limit to the size of the cards that can be used. Thus, the potential number of holes on these cards, which corresponds to the size of the collection that can be entered in this system, is definitely limited.

It is the object of the present invention to enlarge the capacity of such systems very considerably while yet allowing the use of cards of moderate and practical size.

Another object of the invention is to provide a search system, simple enough and low enough in cost to allow large-scale dissemination of the same.

The manner in which these and other aims can be accomplished, will be discussed with reference to the following figures:

FIG. 1 shows a term card of the superimposable card system.

FIG. 2 is a perspective view of a camera installation to photograph said term cards.

FIGS. 3 and 4 show the film to be used in this invention and transport and alignment means for such film.

FIGS. 5 and 6 show plan and elevation views respectively of a different example of the film to be used and the transport and alignment means.

FIG. 7 shows a perspective view of a viewer for superimposed film frames.

FIGS. 8 and 9 show plan and elevation views respectively of a superimposition holder to hold film frames accurately in superimposition.

Figure 10:
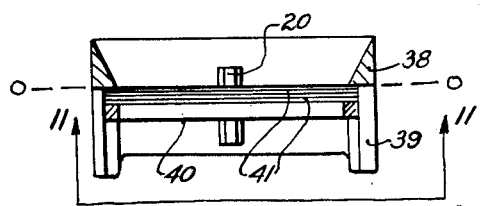
FIGS. 10 and 11 show a different embodiment of the device of FIGS. 8 and 9

FIG. 1 shows a term card of a superimposable card system. The card 1 is dedicated to the term "computer." The dashed lines 2 designate the area within which the holes 6 are located. If the system has a capacity of, for example, 10,000 items, the location of the holes would correspond to a coordinate system of 100 positions along the horizontal axis. Thus, if the coordinates 4 and 5 of the hole 3 are respectively 48 and 25, the position of the hole 3 corresponds to the document No. 4825.

Identification of the hole numbers can be performed, for example, by means of a grid printed on the card 1 and designated by numeral 7. It is also possible to print this grid on a transparent read-out card, which is superimposed on card 1.

*The camera*

The means whereby the objectives of the invention are brought about is the application of photographic miniaturization of the superimposable termcards. This will allow inexpensive duplication and dissemination. It also allows a considerable increase in capacity and search speed.

FIG. 2 shows an embodiment of the camera installation according to the invention. The base of the machine 8 is covered with a translucent window 10. The column 12 carries a camera 13 as well as a lightsource 14.

If the cards 1 are opaque or dark in color, they can be exposed by means of lightsource 8 in the base of the installation.

If the cards are semi-transparent, as most paper is, a black card is first placed in the machine. The termcard is then placed on top of this and exposed by means of the overhead light source 14. The negatives thus obtained are directly usable as termcards. They will have an opaque background with transparent dots.

Numeral 11 designates the display of the term, which will be photographed with the card. The display will be of such size that it will be readable with the naked eye even after reduction to microform.

According to the invention the film will be provided with what will be termed positioning cuts such as holes or notches in the film. While the film is exposed, it is held accurately in position in the camera by means of these positioning cuts. This assures that images of the termcards will always have the same relative position to the alignment holes or notches.

Thus these positioning cuts can be used to align the micro-termcards in superimposition in such a manner that the images of the termcards will superimpose accurately.

FIGS. 3 and 4 show an example of film having conventional sprocket holes as positioning cuts. FIG. 3 is a top-view of the film. FIG. 4 is a sideview. The camera film transport mechanism consists of a sprocket wheel 19. The teeth of this sprocket wheel 19 engage the sprocket holes 18. Every time this sprocket wheel turns over an angle encompassing six teeth, it is locked in position and the film is ready for another exposure. Camera film transport mechanisms of this nature are well known in the moving picture art but have not been used in microfilm applications. Numeral 16 in FIG. 3 designates the area 2 in card 1 of FIG. 1, within which all holes are located. Numeral 17 designates the area showing the "term," in large enough print to be readable with the naked eye.

FIGS. 5 and 6 show two views of a different type of film and the corresponding film transport mechanism. According to the present invention, it has notches 19 in its edge. According to the invention the camera film transport takes place by means of a conventional pressure-roller mechanism shown in FIG. 6 where numerals 23 designate the rollers.

The exact positioning takes places by means of locking pins 20 moving into the notches 19. These locking pins could, for example, be moved by the solenoids 21 working against a spring 22. To allow exact positioning, the rollers 23 will be moved slightly apart, while the pins 20 are being moved into the notches 19. This could, for example, be performed by a solenoid 24 working against a spring-pressure 25, as shown in FIG. 6. Many other different ways of moving pins 22 and rollers 23 are possible, all falling within the scope of the invention.

It is part of the invention that the notches 19 will be shaped in such a manner that the edge of the film has the tooth shape of a rack and can be engaged by a pinion.

*The viewer*

The termcards, which have in this manner been photographically miniaturized to film frames, can be viewed in the viewer shown in FIG. 7. Numeral 26 is a holder in which a number of film frames can be superimposed. It is then placed in the viewer and the coinciding holes can be viewed on a screen 27. FIG. 8 and 9 and FIGS. 10 and 11 show two different embodiments of the holder 26.

FIGS. 8 and 9 show a bottom view and side view respectively of an example of a holder 26 to be used for sprocketed film. It consists of four sections 29, expandably connected by means of the slidable pins 31. The spring 32 tends to expand the holder. In use, the holder 26 is compressed by hand and mounted with the legs 30 protruding through the four corner sprocket holes. Numeral 33 designates a pressure plate with a viewing hole equal to the viewing area 16 (FIGS. 3, 4, 5, 6) of the film frames, which is shoved against the film frames 36 (FIG. 9). The holder can then be released and the pressure of the springs 32 will lock the film frames 36 and plate 33 securely in position. The entire assembly can then be placed in the viewer of FIG. 7. Numeral 37 in FIG. 9 designates that part of the viewer on which the filmholder is mounted. Numeral 35 designates the light.

Figure 11:
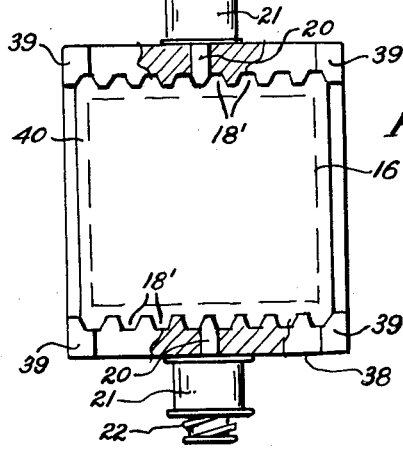

If the rack film of FIGS. 5 and 6 is used, a film holder as shown in FIGS. 10 and 11 could be used. The film frames are loosely held between the four legs 39 of the frame 38. Again a pressure plate 40 having a viewing area equal to the area 16 of FIGS. 5 and 6 and teeth 18' along two of its edges, is placed over the film frames 41, (FIG. 10). The fine positioning and locking in position can be performed by pins and solenoids similar to the mechanism of FIG. 5. Pins 20, fitting into notches 19, are moved between the same by means of solenoids 21 working against spring 22. The line O—O in FIGS. 9 and 10 designates the object plane.

Figure 12:
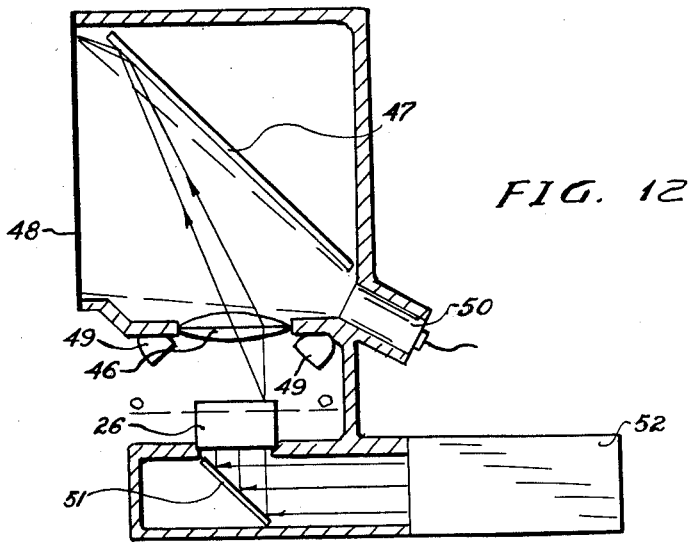
FIG. 12 shows a cross section of the reader of FIG. 7.

FIG. 12 shows a cross section through the viewer of FIG. 7. Numeral 52 designates the source of light. According to the invention, this will be collimated or parallel light. A mirror 51 reflects this light through the film holder 26. This could be the device of FIGS. 8 and 9 or the device of FIGS. 9 and 10. The line O—O designates the object plane. The light passes through the lens 46 and is reflected by mirror 47 and the image focusses on the rear projection screen 48.

If the screen 48 has a read-out grid comparable to the grid 7 shown in FIG. 1 printed on the front of it, only the light source 52 is required. However, according to the invention it is also possible to utilize a transparent film frame with this grid on it, for this purpose. This film frame is placed in the holder 26, before the regular film frames are placed in it. The grid will consist of white lines and figures on a transparent background. In that case a source of front light 49 to illuminate this grid will also be required. This grid film frame will be mounted in the object plane O—O.

Organization of termfile

Figure 13:
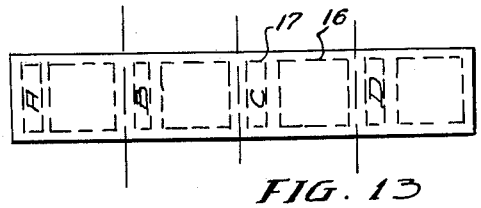
FIGS. 13 and 14 show two different ways in which the file of micro-termcards can be organized.
Figure 14:
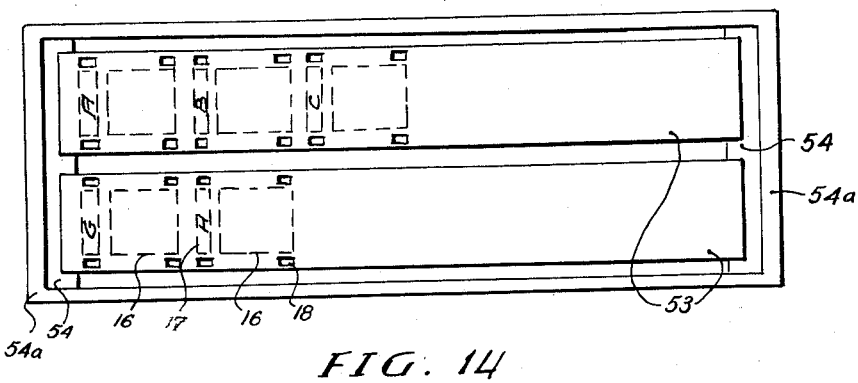

FIGS. 13 and 14 show two different ways in which the film frames can be kept. The most logical procedure is simply to maintain individual film frames dedicated to a term.

Such individual film frames are hard to handle and liable to get lost. FIG. 13 shows an arrangement where a multiple, dedicated respectively to the terms "A," "B," "C," and "D" are kept together in one strip. The disadvantage is that this requires duplication of the entire file, to provide for the rare case that a search requires superimposition of two terms forming part of the same strip. However, the strips are easier to handle than the small frames and less likely to get lost.

FIG. 14 shows an arrangement where still larger numbers of term frames are kept together in one unit. Here a number of filmstrips each having a number of frames are held in a metal frame. Instead of being clamped directly in the frame, either end of the strips 53 have been glued to resilient plastic strip 54. These strips 54 have in turn been clamped in the metal frame 54a.

It is also possible to keep all termframes on one single tape. In that case, a search will require the tape to be doubled back a number of times in order to superimpose the required frames.

Extension of size of the collection

The previous disclosure pertained to information collections of a size not exceeding the capacity of one "set" of termcards. In the example of FIG. 1, this would be a capacity of 10,000 items of information. Larger collections can according to the invention be handled as follows:

Each 10,000 items of information is recorded into a different set of termards. For example, 300,000 items would require 30 sets of cards. All of these cards are photographed. The film frames corresponding to these cards are then assembled into termtapes as shown in FIG. 15.

Figure 15:
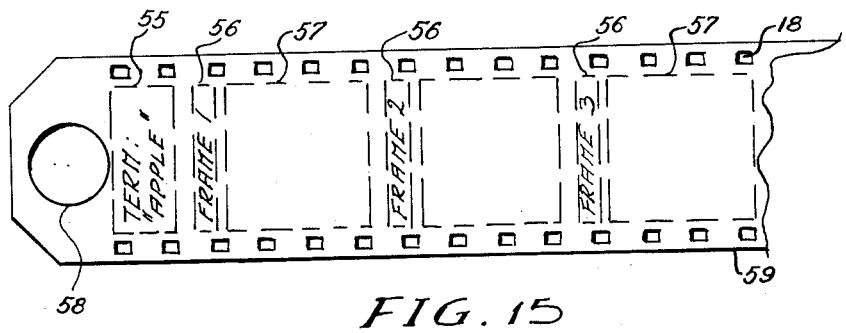
FIG. 15 shows an example of a "termtape" to be used for large information collections instead of termcards.

Area 55 in FIG. 15 designates the term in which this tape is dedicated. In the case of FIG. 15 it is the term "Apple." Section 55 is followed by three different frames, namely, frames 1, 2 and 3. Frame 1 pertains to the term Apple in the first 10,000 items of information. Frame 2 pertains to the term Apple in the second 10,000 items of information, etc.

Thus a data collection of 1,000,000 items requires a termtape of 100 frames for every term in the "vocabulary" of the system.

In searching this collection for, for example, data on the pruning of apple trees, the termtapes "Pruning," "Apple" and "Tree" will have to be superimposed and scanned frame by frame. This could be done by means of the filmholder of FIGS. 8 and 9 or the one of FIGS. 10 and 11. However, this manual frame by frame process woudl be extremely slow.

The invention therefore provides for a mechanism that will automatically bring the consecutive filmframes of the superimposed tapes that are being scanned, under the viewer while held in accurately aligned superimposition.

For that purpose, the stationary film holder 26 of FIGS. 7 and 12 is replaced by a moving filmholder or film transport mechanism shown in FIGS. 16 through 19.

Although the moving film-transport mechanism could be based on adaptations of a conventional film-transport mechanism used in the moving picture industry, these mechanisms lack the capability of aligning a large number of superimposed films with sufficient accuracy.

However, the film-transport mechanism according to the invention has the following advantages: it can move the superimposed film at a very high and absolutely steady speed; it can also move the film frame by frame, stopping the movement entirely during one part of the cycle, as is customary in moving picture projectors. It is also possible to stop the movement of the film-transport mechanism entirely.

According to the invention, the film of the termtapes will be provided with the type of positioning cuts 19 shown in FIG. 5. The process of making termtapes involves a photographic transfer process and development processes, etc. Since many of the commercial processors are based on film with sprocket holes, it will be desirable for the film also to have the regular sprocket holes. The rack teeth will then be cut with the sprocket holes as reference points, by using them for the positioning the film in the cutting of the rack teeth.

Figure 16:
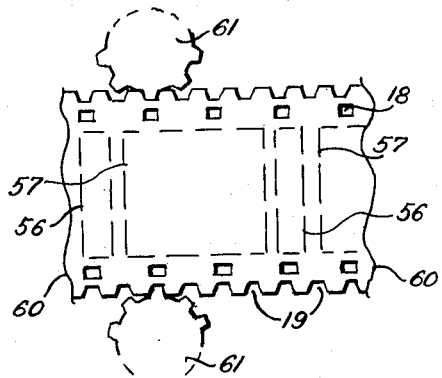
FIG. 16 shows a preferred form of positioning cuts to be used with said termtapes.

FIG. 16 shows a section of such a termtape 60. It shows the sprocket holes 18, the rack teeth 19, the areas for the frame number designation 57 and the memory area proper 56 corresponding to the area 2 in FIG. 1. Also shown are two pinions 61 engaging the rack teeth.

Figure 17:
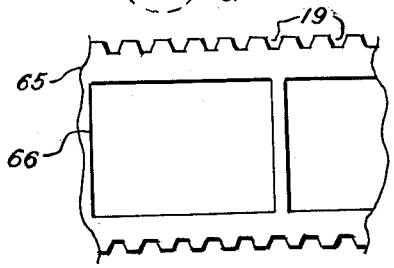
FIG. 17 shows flexible metal guide strips used in conjunction with the film transport mechanism of FIGS. 18 and 19.
Figure 18:
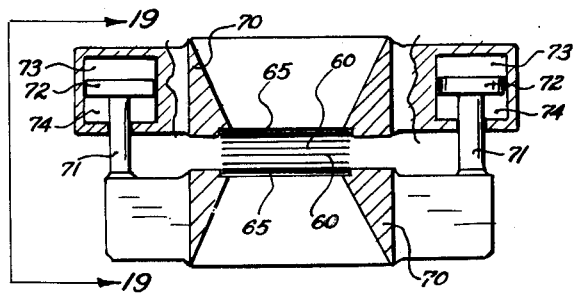
FIGS. 18 and 19 and 20 show the film transport mechanism for large information collections based on termtapes.
Figure 19:
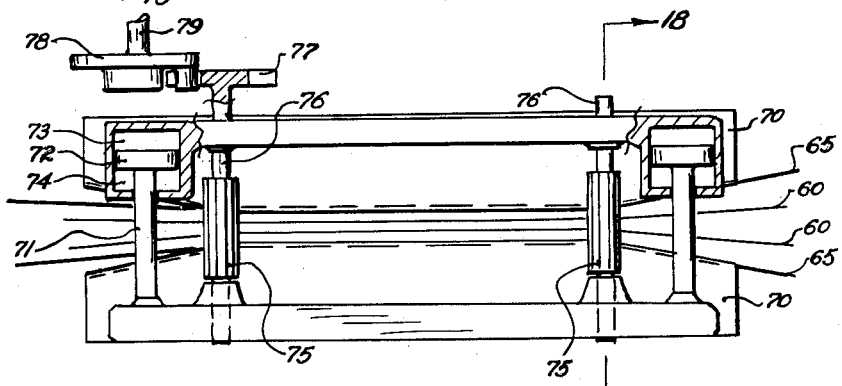

The film transport mechanishm is shown in FIGS. 18 and 19. It comprises two boat-shaped bodies 70, each having a track for a thin metal belt 65 on its curved side. FIG. 17 shows a section of these belts. They have the same width and the same rack teeth as the termtapes 60 and comprise windows 66 having an area equal to the combined areas of 56 and 57 of the termtapes.

The bodies 70 and the belts 65 can be pushed together under pressure, for example by means of oil pressure admitted in the area 74 under the four pistons 72, in FIGS. 18 and 19.

In operation, the termtapes 60 are fed in superimposition between two belts 65 into the space between the boat-shaped bodies 70. In this compressed and compacted state, they are engaged by the two pinions 75 mounted on either side of the bodies 70, on shafts 76 and driven by the same. The shafts 76 are slidably mounted in the uppermost of the bodies 70, so that they can be moved vertically in relation to each other.

Actually only one of the four shafts 76 need be driven. It can be driven at a steady speed or by means of a Geneva wheel drive 77 and 78.

Figure 20:
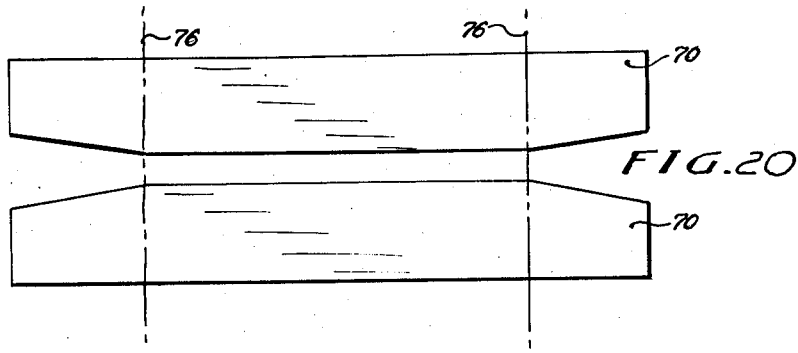

FIG. 20 showing the contours of the boat-like bodies 70 and the center lines of the shafts 76 shows how the shafts 76 are located exactly at the spot where the sloping sections of the bodies 70 go over into the horizontal section. As a result the alignment of the filmtapes will be effected exactly at the moment they will be clamped down together.

Visual viewing

The film transport mechanism when driven for frame by frame viewing is used in conjunction with the viewer shown in FIGS. 7 and 12, where it replaces the stationary filmholder 26. For this purpose the viewer of FIG. 12 comprises a lightmeter 50. The field of vision of this lightmeter is equal to the area of the screen 48. In operation the film transport mechanism will be driven by the Geneva wheel drive at a rate of, for example, 20 frames per second. Each frame will be held stationary during part of the movement cycle of 1/20 second.

Whenever, in operation, coinciding holes in the superimposed filmframes throw any light on the screen 48, the lightmeter 50 will cause the film transport mechanism to stop, so that the serial numbers of these coinciding holes can be read off.

Figure 22:
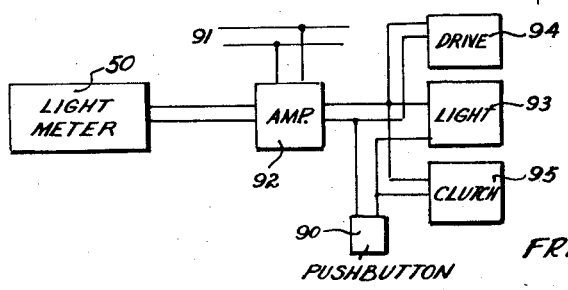
FIGS. 22 and 23 show block diagrams of the operation of the viewers of FIG. 12 and FIG. 21 respectively.

FIG. 22 shows a block-diagram of this regulation of movement. Numeral 50 designates the lightmeter. Signals coming from it are amplified in the amplifier 92 which receives its power from the wires 91. The output signal from the amplifier 92 energizes a relay which lights the front lighting 49, so that the read-out grid will be visible on the screen; it energizes a switch that turns off the power of the drive motor and it energizes a fast acting clutch to stop and lock the drive shaft in the Geneva-wheel drive instantly. Numerals 93, 94 and 95 in FIG. 22 designate respectively the front lighting, the drive power and the brake and lock clutch.

After the serial numbers of the coinciding holes have in this manner been read off, the mechanism is restarted by pushing button 90 which will interrupt the signal of the amplifier to the brake-clutch mechanism and unlock the drive shaft. It will also douse the front lighting. The drive shaft can then be cranked by hand till the frame having the coincidence of holes is no longer visible on the screen. This interrupts the output signal from the lightmeter and restores the drive power so that the drive motor will start up again.

Automatic viewing

Figure 21:
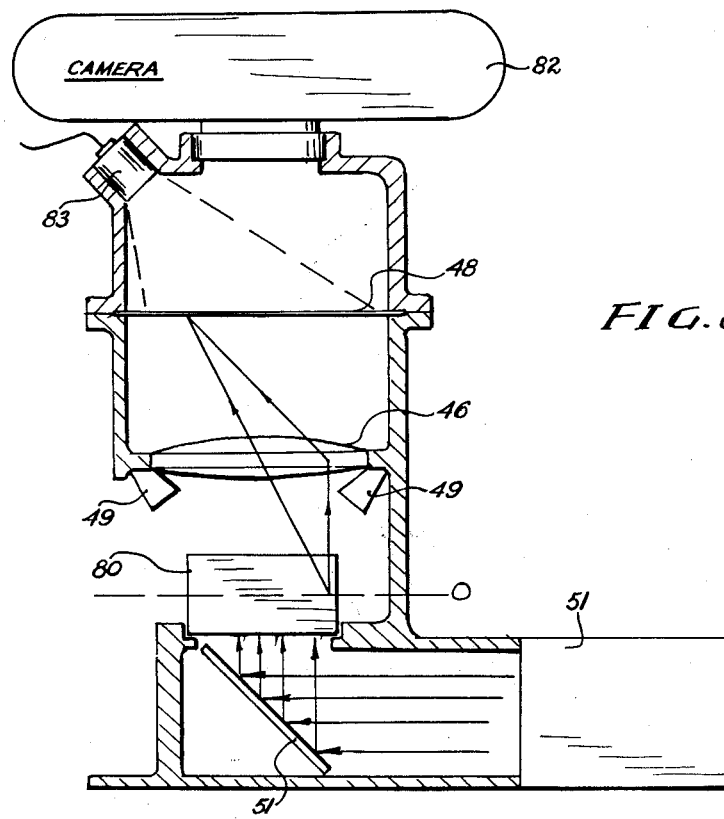
FIG. 21 shows a modification of the viewer of FIG. 12.

FIG. 21 shows a modification of the viewer of FIG. 7, adapted for automatic recording of the search results. Numeral 52 designates a source of collimated light. It is deflected by mirror 51, into the film transport mechanism 80. The line O—O designates the object plane. The light goes through the lens 46 and focusses on the rear projection screen 48. Numeral 82 is a rapid-action camera to photograph the filmframes having coincidence of holes. The camera is fast enough in action to use the short stop provided by the Geneva wheel action, for exposure. The lightmeter 83 triggers the camera 82.

Figure 23:
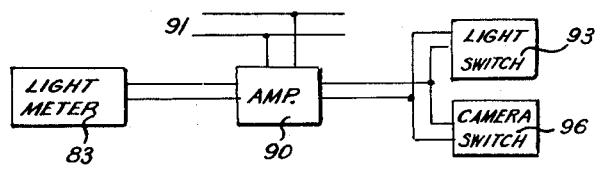

FIG. 23 shows a block diagram of this trigger action. The lightmeter 83 feeds into an amplifier 90 receiving its power from the lines 91. The amplifier output signal energizes a switch 93 which turns on the front lighting 49 in FIG. 21, and switch 96 triggers the camera 82. The camera is of the type well known in the art, where after an exposure the film will advance automatically so that the camera will immediately be ready for a new exposure.

According to the invention it is also possible to replace the camera 82 by a flying-spot scanner, adapted for a matrix-scan of an entire frame at a time.

According to the invention it is also possible to drive the film transport mechanism non-intermittently at a steady speed, and replace camera 82 by a flying spot scanner adapted for line-scan, and derive the signal to drive this scanner from the mechanism driving the film transport mechanism.

Figure 24:
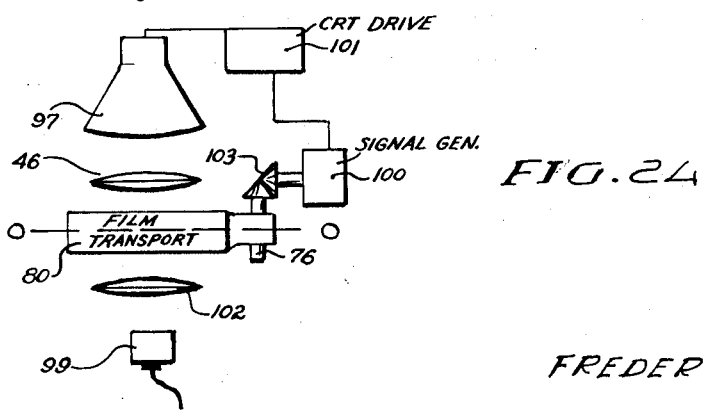
FIG. 24 shows a schematic diagram of a reader having a flying spot scanner.

FIG. 24 shows a block diagram of this embodiment of the viewer. Numeral 80 designates the film transport mechanism. Through the shaft 75 and the bevel gears 103 it drives a signal generator 100. This signal is fed into the drive 101 of the cathode ray tube 97 in such a manner that the line scan of 97 and the film movement will be synchronous. Numerals 46 and 102 designate lenses. Numeral 99 designates the photocell.

According to the invention it is possible to attach the lightmeter 50 in FIG. 12 or 83 in FIG. 21 to an integrating circuit. If the output is calibrated, this will allow an approximate count of the total number of answers, by running the superimposed termtapes through the machine without stopping either at a constant speed or with the intermittent Geneva-wheel drive.

In the foregoing specifications and following claims all references to light, holes or light-penetrable areas comprise visible as well as invisible radiation and holes and light-penetrable areas comprise areas through which said form of light can penetrate in cards that are substantially impenetrable to said light.

In the foregoing specification and following claims the word term is considered to comprise single words, classes, subject headings, code-symbols or other symbols, symbols from the English alphabet or from some code alphabet, numerals, etc. In general anything used to identify a card is considered a term.

The invention does not limit itself to the embodiments shown but encompasses all embodiments contained within the scope of the claims.

What is claimed is:

1. A method of information storage and retrieval which comprises entering data on superimposable cards dedicated to terms or code symbols by making holes in said cards at positions dedicated to the serial numbers of the items of information to be entered, photographing said cards on transparent material whereby the resulting photographic cards are very much smaller in size, and superimposing certain of said photographic cards, and determining the location of that area or areas of said superimposed photographs through which light passes.

2. A method of information storage and retrieval which comprises entering data on superimposable cards dedicated to terms or code symbols by making holes in said cards at positions dedicated to the serial numbers of the items of information to be entered, photographing said cards on transparent material whereby the resulting photographic cards are considerably smaller in size, the composition of a number of said photographic cards dedicated to the same terms into larger photographic cards, and retrieving said information by superimposing a number of said larger photographic cards, and determining the area or areas of said superimposed photographs through which light passes.

3. In a method of storing and retrieving information, the steps comprising entering data on superimposable cards dedicated to terms by making holes in said cards at positions dedicated to the serial numbers of the items of information to be entered, photographing each of said cards on transparent material to form photographs of all of said cards of a greatly reduced area, superimposing selected photographs of said cards, and determining the location of that area or areas of said superimposed photographs through which light passes, whereby the location of said area or areas may be read in terms of serial numbers of stored information.

4. A method as set forth in claim 3, in which the location of the area or areas of superimposed photographs which permit light to pass therethrough is determined by creating a magnified image of said superimposed photographs.

5. In a method of storing and retrieving information, the steps comprising entering data on superimposable cards dedicated to terms by making holes in said cards at positions dedicated to the serial numbers of the items of information to be entered, photographing said cards on film to form photographs of all of said cards of a greatly reduced area, superimposing selected photographs of said cards, producing a magnified image of said superimposed photographs and determining the location of that area or areas of said superimposed photographs through which light passes, whereby the location of said area or areas may be read off in terms of serial numbers of said stored information.

6. A method as set forth in claim 5, in which said superimposed selected photographs are set in relative motion until an area is found through which light passes.

7. An apparatus for retrieval of information which has been entered on a plurality of superimposed cards by making holes in said cards at positions dedicated to the serial numbers of the information to be entered, and which cards have been photographed on film of much smaller area than said cards, comprising means for holding a plurality of said film photographs in accurately superimposed position in an area capable of permitting light to pass through said plurality of film photographs, illuminating means to pass light through certain areas of said plurality of film photographs in said accurately superimposed position, and means for locating the area or areas of said superimposed photographs through which light passes, whereby the location of said areas or areas may be read in terms of serial numbers of entered information.

8. The apparatus as set forth in claim 7, in which the means for holding the plurality of film photographs in accurately superimposed position includes a transport device for moving a plurality of elongated strips of superimposed film photographs.

9. The apparatus as set forth in claim 7, characterized by projection means to project a magnified image of said superimposed film photographs upon a viewing screen.

10. The apparatus as set forth in claim 7, characterized in that the means for holding the plurality of film photographs in accurately superimposed position includes a transport device for moving a plurality of elongated strips of superimposed film photographs, projection means to project a magnified image of said superimposed film photographs upon a viewing screen, and light sensitive means to control the movement of said transport device.

11. The apparatus of claim 10, in which said projection means includes a location grid for locating in $x$–$y$ coordinates each projected area which permits light to pass therethrough.

12. An apparatus for retrieval of information which has been entered on a plurality of superimposed cards by making holes in said cards at positions dedicated to the serial numbers of the information to be entered, and which cards have been photographed to a much smaller area than said cards, comprising means for holding a plurality of said photographs in accurately superimposed position, illuminating means for passing light upon said plurality of photographs in accurately superimposed position, means for producing a magnified image of said superimposed photographs, and means for determining the location of the area or areas of said superimposed photographs through which light does pass, whereby the location of said area or areas may be read off in terms of serial numbers of said entered information.

13. The apparatus as set forth in claim 12, characterized by means to photograph the magnified image of light passing through said superimposed photographs.

14. An apparatus for retrieval of information which has been entered on a plurality of superimposed cards by making holes in said cards at positions dedicated to the serial numbers of the information to be entered, and which cards have been photographed to a much smaller area than said cards, certain of said photographs being made on a continuous film tape, means to hold a plurality of such tapes in accurately superimposed position, means to move said superimposed tapes past a position whereby said superimposed tapes are illuminated, illuminating means at said position, and means to project a magnified image of light passing through said superimposed tapes at said position.

15. The apparatus as set forth in claim 14, characterized by means to photograph said magnified image, and illumination sensitive means for operating both said tape moving means and said means to photograph the magnified image.

16. The apparatus as set forth in claim 14, characterized by a signal generator, means connected to said film tape moving means for operating said signal generator, and an electronic scanning means for scanning said magnified image, the output of said signal generator being utilized to synchronize said film tape moving means and the sweep circuit of said electronic scanning means.

17. The apparatus as set forth in claim 14, in which the means to move said superimposed tapes includes a plurality of members movable to compress said tapes between said members, means to move said members towards and away from said superimposed tapes, and tape-edge contacting means for aligning and driving said tapes forward.

18. The apparatus as set forth in claim 12, in which the means for holding said plurality of photographs in accurately superimposed position comprises a resilient frame provided with film gripping means extending therefrom.

References Cited by the Examiner

UNITED STATES PATENTS

| | | | |
|---|---|---|---|
| 1,233,545 | 7/17 | Biucchi. | |
| 1,491,946 | 4/24 | Crocker. | |
| 1,580,114 | 4/26 | Brewster. | |
| 1,738,054 | 12/29 | Hill | 88—26 X |
| 1,819,883 | 8/31 | Fleischer | 88—16 |
| 2,036,717 | 4/36 | Newman | 88—18.4 |
| 2,114,417 | 4/38 | Ellinson | 88—26 X |
| 2,124,906 | 7/38 | Bryce. | |
| 2,179,000 | 11/39 | Tea | 88—14 |
| 2,209,342 | 7/40 | Loughridge et al. | 88—24 |
| 2,266,779 | 12/41 | Loughridge et al. | 88—10 |
| 2,390,439 | 12/45 | Johnson | 88—74 |
| 2,521,483 | 9/50 | Scatena. | |
| 2,557,797 | 6/51 | Rand | 235—61.12 |
| 2,580,270 | 12/51 | Badgley et al. | 88—24 |
| 2,659,265 | 11/53 | Martin | 88—14 |
| 2,669,034 | 2/54 | Luppen | 35—48 |
| 2,795,705 | 6/57 | Rabinow | 88—10 |
| 2,830,285 | 4/58 | Davis et al. | 88—24 X |
| 2,846,921 | 8/58 | Glass et al. | 88—24 X |
| 2,953,300 | 9/60 | O'Brian et al. | 235—61.12 |

NORTON ANSHER, *Primary Examiner.*

EMIL. G. ANDERSON, WILLIAM MISIEK, EVON C. BLUNK, *Examiners.*